Aug. 30, 1932.  A. L. FREEDLANDER  1,874,490
GASKET
Filed Jan. 2, 1930  2 Sheets-Sheet 1

Inventor
ABRAHAM L. FREEDLANDER,
by
Toulmin & Toulmin
Attorneys

ABRAHAM L. FREEDLANDER,

Patented Aug. 30, 1932

1,874,490

UNITED STATES PATENT OFFICE

ABRAHAM L. FREEDLANDER, OF DAYTON, OHIO

GASKET

Application filed January 2, 1930. Serial No. 417,881.

My invention relates to gaskets.

It is the object of my invention to provide a method of manufacture of a gasket and a resulting gasket which will be characterized by the fact that it expands radially but not laterally, thereby tending to increasingly seal a shaft on which it may be mounted from leakage around the shaft.

It is a further object to provide a gasket which will not be distorted, warped or disintegrated by heat, pressure, oil, and certain types of corrosive liquids.

It is a further object to provide a gasket which is relatively incompressible laterally and relatively compressible radially.

Referring to the drawings, Figure 1 is a side elevation of the gasket.

Figure 1:
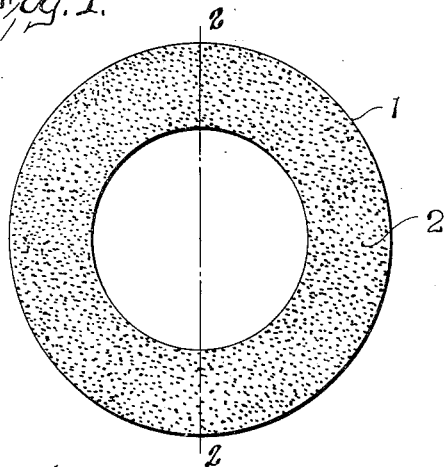
Figure 2:
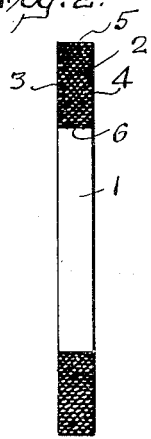
Figure 2 is a section on the line 2—2 thereof.
Figure 3:
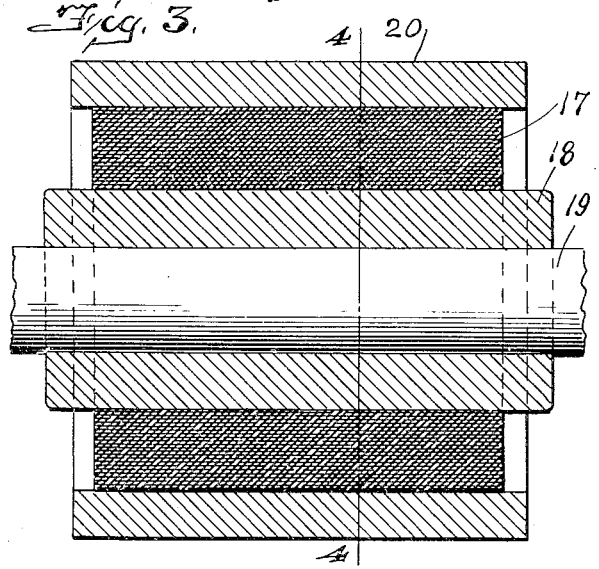
Figure 3 is a section through the interior mandrel, a body of gasket material and an exterior mandrel as positioned for vulcanization.
Figure 4:
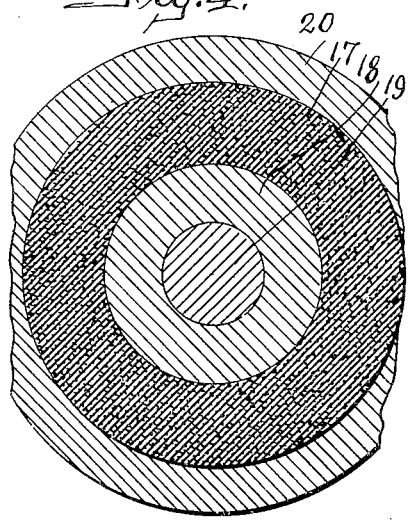
Figure 4 is a section on the line 4—4 of Figure 3.
Figure 5:
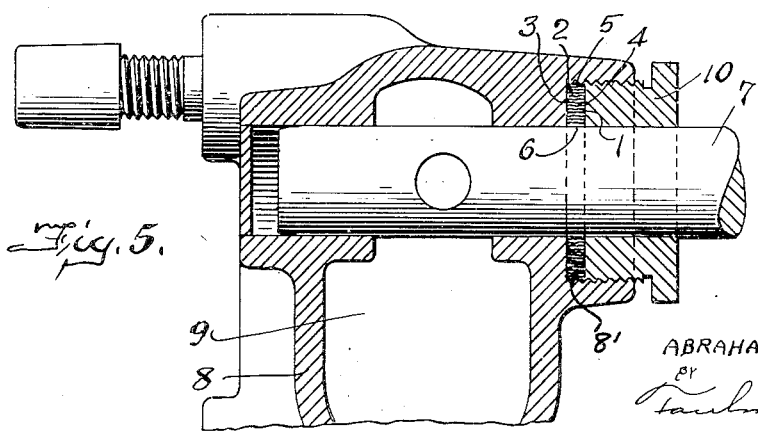
Figure 5 is a section through a shaft with the gasket in position for sealing the shaft.

It will be understood in referring to gaskets, that such an article is merely typical of any number of suitable articles which can be made from this compound by this process and I do not desire to confine myself to the method of making this article alone or to this article alone, as my invention is adapted for use in any situation where a rubber member may be employed where it is desired to have expansion in one direction and no expansion in another.

Referring to the drawings in detail, the gasket is comprised of a rubber compound of any suitable character generally designated 1 and a plurality of fine fibrous members marked 2 which are arranged with their major axes parallel to the major transverse axes of the gasket. These fibres are arranged so that their length will be in the direction in which the body of the gasket is relatively imcompressible. The gasket itself, if engaged on the sides 3 and 4, will not compress whereas if engaged on the periphery 5 or the interior 6, or both, it will either compress or under the influence of oil, steam, or other liquids, it will expand outwardly and inwardly so that it will form a seal around the shaft 7. This comes about due to the fact that the gasket is surrounded on the periphery 5 by the enclosure 8' and therefore can only expand in the direction towards the shaft 7.

It has been found that in the use of this gasket with shock absorbers containing oil which must be tightly sealed from leakage around the constantly moving shaft 7, the oil being contained in the space 9 within the housing 8, that the gasket may be located in position by the threaded nut 10 which need not thereafter be adjusted as pressure on the sides 3 and 4 will not laterally compress the gasket, but under the influence of oil, heat, etc., the gasket can expand in a radial direction and thereby take up oil and make a tight seal with the shaft 7.

The transverse fibrous members 2 individually are very fine, but when arranged all in the same direction in a compound mass with a rubber compound binder satisfactorily vulcanized, they present in a gasket a substantially incompressible body. But this limitation does not prevent them, due to their fibrous character, and the rubber with which they are associated, from expanding in a radial direction, particularly under the influence of heat, oil, moisture, etc.

Figure 6:
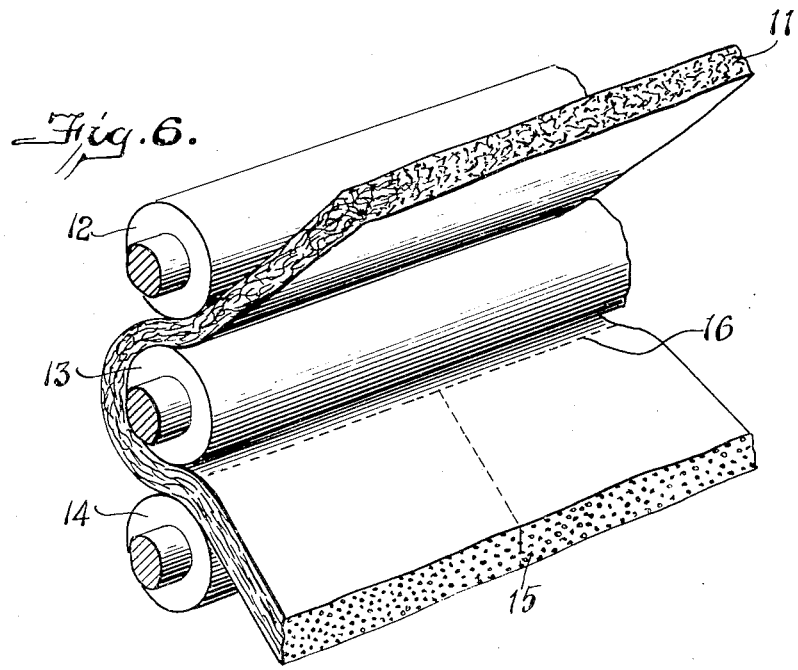
Figure 6 is a perspective of a calender machine indicated diagrammatically with the material out of which the gasket is being made indicated as entering, passing through and making its exit from the calender machine, showing the result diagrammatically of the arrangement of the fibres in the compound.

Turning to the method of manufacturing, the fine fibres are mixed as shown in Figure 6 in the rubber compound prior to vulcanization and delivered from the machine in a mass in the form of a sheet with fibres running in all directions as at 11. The mass passes between the calender rolls 12, 13 and 14, coming out in a sheet as at 15 with the fibres arranged longitudinally of the sheet and all generally in one direction. This sheet is cut off in transverse strips along the dotted lines indicated at 16 and then wound in a cylinder as at 17 on the mandrel 18 which is supported on the shaft 19. A sizing mandrel or cylinder is mounted on this cylinder of material 17. It is designated 20. After the mass has been formed, as shown in Figure 6, a part thereof sufficient to form the cylinder 17 is cut off, as indicated by the lines 16 on Figure 6. This piece cut from the mass of material is just sufficient in size to extend around the mandrel 18 with the raw edges abutting each other so that they unite. This severed piece is placed upon the mandrel in such a way that the finely divided and distributed fibers therein extend longitudinally of the mandrel axis so that when the cylinder is cut into gaskets these fibers are cut. By this cutting the cylinder is formed into a large number of gaskets in which the fibers are substantially perpendicular to planes parallel to the radial lines of the gaskets.

Figure 7:
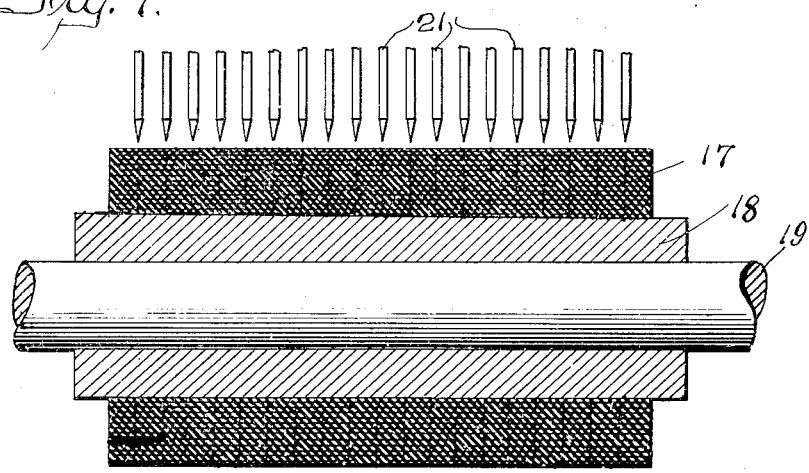
Figure 7 is a section through the mandrel and vulcanized sleeve of gasket material in position to be cut by the knives indicated into a plurality of gaskets.

When in this condition the fibres all lie with their length parallel to the length of the mandrel. The compound is then vulcanized with the mandrel 3 in position, after which the outer mandrel 20 is removed and the knives 21 are used to cut the gaskets shown in Figure 7.

It is desirable that in mixing the fibres in the rubber, that the fibres shall not be broken into short pieces. If the fibres are too long, you will get the pronounced grain effect but you will lack uniformity of the batch. The control of the length of fibres is secured by adjusting the calender mill rollers in mixing the batch and passing the rubber fibre mixture through the tight mill a given number of times, depending upon the rubber composition and the fibres. I have found that cotton fibres work best although it is possible to use fibres of different materials.

It will be understood that I desire to comprehend within my invention such modifications as may be necessary to adapt it to varying conditions and uses.

Having thus fully described my invention, what I claim as new and desire to secure by Letters Patent, is:

1. A new article of manufacture for use as a gasket comprising an annular body of resilient material having a plurality of individual fibrous members arranged parallel to the transverse axis of the gasket.

2. A new article of manufacture comprising a gasket of resilient material and textile material arranged in one direction to form a radially expansible and laterally incompressible gasket.

3. A new article of manufacture for use as a sealing member, comprising a resilient body and fine fibrous members distributed through the body in parallel relationship to one another for forming a body incompressible in the direction of their length and laterally compressible or expansible.

4. In a method of making a sealing member, mixing fine long fibrous members in a resilient compound, arranging said fibres in one direction parallel to one another in superimposed relationship in the compound, cutting into strips transversely of the length of the mass so formed, wrapping on a mandrel with the fibres parallel to the length of the mandrel, vulcanizing, and cutting into predetermined widths from the mandrel.

5. In a method of manufacturing a sealing member, arranging and distributing a plurality of fine fibrous members in superimposed relationship in the same direction in a rubber compound, forming the rubber compound into a continuous band vulcanizing and cutting the band transversely of the fibres into strips.

6. A new article of manufacture comprising an annular body of resilient material having a plurality of finely divided and distributed fibrous members arranged parallel to the transverse axis of the annular body.

7. A new article of manufacture comprising an annular body composed of resilient material and a fibrous material intimately mixed therewith to form a gasket radially expansible and laterally incompressible.

8. A new article of manufacture comprising an annular body of resilient material having a plurality of individual fibrous members arranged parallel to the transverse axis of the annular body.

9. A new article of manufacture comprising resilient material and a fibrous material arranged laterally so that the article is radially expansible and laterally incompressible, said fibrous material being composed of fibers distributed through the resilient material and arranged parallel in the direction of incompressibility.

In testimony whereof, I affix my signature.

ABRAHAM L. FREEDLANDER.